US 11,888,844 B2

(12) United States Patent
Hong

(10) Patent No.: US 11,888,844 B2
(45) Date of Patent: Jan. 30, 2024

(54) ELECTRICAL CIRCUIT TESTING DEVICE AND METHOD

(71) Applicant: SECUVE Co., Ltd., Seoul (KR)

(72) Inventor: Ki-Yoong Hong, Seoul (KR)

(73) Assignee: SECUVE Co., Ltd., Seoul (KR)

( * ) Notice: Subject to any disclaimer, the term of this patent is extended or adjusted under 35 U.S.C. 154(b) by 364 days.

(21) Appl. No.: 16/862,330

(22) Filed: Apr. 29, 2020

(65) Prior Publication Data

US 2020/0259822 A1    Aug. 13, 2020

Related U.S. Application Data

(63) Continuation-in-part of application No. 15/117,991, filed as application No. PCT/KR2014/010930 on Nov. 13, 2014, now abandoned.

(30) Foreign Application Priority Data

Feb. 18, 2014    (KR) .......................... 10-2014-0018210

(51) Int. Cl.
*H04L 29/06*        (2006.01)
*G06Q 20/40*        (2012.01)
(Continued)

(52) U.S. Cl.
CPC ....... *H04L 63/0838* (2013.01); *G06Q 20/385* (2013.01); *G06Q 20/3829* (2013.01); *G06Q 20/409* (2013.01)

(58) Field of Classification Search
CPC .................................................. H04L 63/0838
See application file for complete search history.

(56) References Cited

U.S. PATENT DOCUMENTS

2005/0151777 A1*  7/2005  Silverbrook ......... H04N 5/2628
                                                    347/19
2005/0216809 A1*  9/2005  Kim ....................... G11C 29/28
                                                    714/738
(Continued)

FOREIGN PATENT DOCUMENTS

KR    2006-0102456 A    9/2006
KR    2009-0022425 A    3/2009
(Continued)

OTHER PUBLICATIONS

Menezes et al.; "Handbook of Applied Cryptography"; CRC Press; Chapters 10, 12; 1996; pp. 400-403, 497, 507-508.

*Primary Examiner* — Phy Anh T Vu
(74) *Attorney, Agent, or Firm* — Bridgeway IP Law Group, PLLC; Jihun Kim

(57) ABSTRACT

The present disclosure relates to an electrical circuit system for performing a test. The electrical circuit system includes a first circuitry that transmits a test request signal; a second circuitry that receives a response signal including a test authentication key, generates a test authentication-related value by performing a first Exclusive-OR operation on the test authentication key and a security, and sends the generated test authentication-related value to a third circuitry; and the third circuitry that generates the test authentication key in response to the request for test authentication, send the test authentication key, to the second circuitry, receives the test authentication-related value from the second circuitry, create a verification key by performing a second Exclusive-OR operation on the test authentication-related value and the security key, and generates a test result by verifying whether the verification key is identical to the test authentication key.

21 Claims, 7 Drawing Sheets

(51) Int. Cl.
*G06Q 20/38* (2012.01)
*H04L 9/40* (2022.01)

(56) References Cited

U.S. PATENT DOCUMENTS

| | | | |
|---|---|---|---|
| 2005/0250473 A1 | 11/2005 | Brown et al. | |
| 2009/0307493 A1* | 12/2009 | Smith | H04L 63/166 |
| | | | 713/168 |
| 2013/0016832 A1 | 1/2013 | Yamashita | |
| 2013/0086649 A1* | 4/2013 | Battistello | H04L 9/083 |
| | | | 726/4 |
| 2014/0237236 A1 | 8/2014 | Kalinichenko et al. | |
| 2014/0304780 A1* | 10/2014 | Kuang | H04L 63/06 |
| | | | 726/4 |
| 2015/0082460 A1* | 3/2015 | Amiga | H04L 63/145 |
| | | | 726/28 |
| 2017/0011393 A1* | 1/2017 | Hong | G06Q 20/409 |
| 2018/0124600 A1* | 5/2018 | Chen | H04L 9/3234 |
| 2018/0336551 A1* | 11/2018 | Mouftah | H04L 9/3213 |
| 2019/0289017 A1* | 9/2019 | Agarwal | H04L 9/12 |

FOREIGN PATENT DOCUMENTS

| | | |
|---|---|---|
| KR | 2012-0087788 A | 8/2012 |
| KR | 2013-0084727 A | 7/2013 |
| KR | 10-1321829 B1 | 10/2013 |
| KR | 2014-0003353 A | 1/2014 |

* cited by examiner

ELECTRICAL CIRCUIT TESTING DEVICE AND METHOD

CROSS-REFERENCE TO RELATED APPLICATIONS

This application is a continuation-in-part of U.S. patent application Ser. No. 15/117,991, filed on Aug. 10, 2016, which is a National Stage Entry of International Patent Application No. PCT/KR2014/010930, filed on Nov. 13, 2014, which claims the benefit of priority to Korean Patent Application No. 10-2014-0018210, filed on Feb. 18, 2014. The disclosures of the above-listed applications are hereby incorporated by reference herein in their entirety.

BACKGROUND

The present disclosure relates to an electrical circuit system for performing a test.

The present disclosure also relates, in general, to a user authentication system for authenticating a user online and, more particularly, to a system and method for user authentication and identity theft prevention, in which user authentication is performed by providing a user terminal unit with an authentication key C, issued upon receiving a request for user authentication, and by generating an authentication-related value corresponding to the authentication key C using a one-time random key, whereby even if the authentication key C is leaked or stolen, the fraudulent use of the authentication key C is prevented and user authentication is safely performed.

Currently, Internet technology has been developed such that a cloud computing environment, in which access to the Internet is possible anywhere anytime, is constructed. With the construction of a cloud computing environment, the use of credit information is increasing online. Such credit information is widely used in various fields such as signing up online, the purchase and sale of goods, economic activities through financial institutions, and the like.

Accordingly, hackers steal credit information, which is being used online, and monetarily harm individuals by fraudulently using the stolen credit information.

Therefore, in order to prevent hackers from stealing personal credit information, Internet systems employ various authentication systems. These authentication systems mainly use a user authentication system for authenticating a user who wants to use an arbitrary service on the Internet (here, user authentication may be called "user identification", "personal authentication", or the like).

Generally, in a user authentication system, in order to check whether a user is an approved user who is permitted to use a corresponding service, that is, in order to authenticate the user when the user requests a service such as registration of the user, a change of user information, payment, or money transfer, user information authentication is first performed by sending user information, input by the user, to an existing authentication system (hereinafter, referred to as a "legacy authentication system") such as a mobile communication system, a credit assessment system, or a public certification system, in which user information corresponding to the user has been registered in advance, and by comparing the user information input by the user with the registered user information, a user authentication message, which includes an authentication number, is sent to the mobile communication terminal of the user whose information has been authenticated, the authentication number is input by the user through a user's computer within a certain time period, and whether the input authentication number is the same as the issued authentication number is checked, whereby user authentication is performed. Generally, according to the method of authenticating a user, the user information, input by the user, may be the social security number of the user, or may be the card number, card validation code (CVC), or expiry date of a credit card owned by the user.

As described above, because the conventional user authentication system requires the input of important personal information and credit information of a user, such as a social security number, a credit card number, and the like, it is problematic in that credit information, such as a user's social security number, may be leaked through memory hacking or the like.

Also, the conventional user authentication system is problematic in that an authentication message, including an authentication number for user authentication, may be stolen and illegally used by a third party.

In order to prevent these problems, Korean Patent Application Publication No. 10-2013-0084727 (hereinafter, referred to as "prior patent 1") and Korean Patent Application Publication No. 10-2014-0003353 (hereinafter, referred to as "prior patent 2") disclose a method in which a user selects, in advance, digits to be used from among the digits of an authentication number, included in a received authentication message, and the user inputs only values corresponding to the digits selected in advance, whereby security is improved.

Also, in order to solve the problem with the above-described conventional user authentication system, Korean Patent No. 10-1321829 (hereinafter, referred to as "prior patent 3") discloses a method in which a user confirmation message that contains a website URL is sent before a user authentication message is sent, a password is input by a user after the user is prompted to access the URL in the user confirmation message, and the user authentication message is sent only when the input password is the same as a previously registered password.

However, the prior patents merely have a difference therebetween as to the method of inputting an authentication number, but still employ a method using mobile messages. Accordingly, they are vulnerable to memory hacking and interception of mobile messages, such as SMS, LMS, MMS, and the like.

Therefore, the prior patents are also problematic in that an authentication number may be hacked and illegally used by a third party.

Furthermore, because the prior patent 3 sends a text message that contains a URL, there is concern that a user may mistake the text message as SMiShing, and when the user mistakes the text message as SMiShing and deletes it, the user may experience inconvenience or may not receive a desired service.

SUMMARY OF THE INVENTION

Accordingly, an object of the present invention is to provide a system and method for user authentication and identity theft prevention in which user authentication is performed by providing a user terminal unit with an authentication key C, issued upon receiving a request for user authentication, and generating an authentication-related value corresponding to the authentication key C using a one-time random key, whereby even if the authentication key C is leaked or stolen, the fraudulent use of the authentication key C is prevented and user authentication is safely performed.

In order to accomplish the above object, a system for user authentication and identity theft prevention using a one-time random key according to the present invention includes: a user terminal unit for receiving a user authentication message, which includes an authentication key (C), in response to a request for user authentication in order to use a service that requires user authentication through an arbitrary service server, creating an authentication-related value (eC) by performing an Exclusive-OR (XOR) operation on the authentication key (C) and a security key (R), which is randomly created as a one-time random key, and sending the authentication-related value (eC); and a user authentication server unit for creating the unique authentication key (C) in response to the request for user authentication, sending the user authentication message, which includes the authentication key (C), to the user terminal unit, receiving the authentication-related value (eC) as a reply thereto from the user terminal unit, creating a verification key (C') corresponding to the authentication-related value (eC) using the security key (R), and performing user authentication by verifying the authentication-related value (eC) using the created verification key (C').

The user terminal unit may include a computer terminal, which accesses the service server and requests user authentication in order to use the service; and a mobile terminal, which receives the user authentication message in response to the request for user authentication, creates the authentication-related value (eC) by performing the XOR operation on the security key (R) and the authentication key (C), and sends the authentication-related value (eC) to the user authentication server unit.

The user terminal unit may include a mobile terminal, which receives the user authentication message in response to the request for user authentication, creates the authentication-related value (eC) by performing the XOR operation on the security key (R) and the authentication key (C), and displays the authentication-related value (eC) therein; and a computer terminal, which accesses the service server and requests user authentication in order to use the service, receives the authentication-related value (eC), displayed in the mobile terminal, from a user, and sends the authentication-related value (eC) to the user authentication server unit.

The mobile terminal may create the security key (R) and provide the security key (R) to the user authentication server unit.

The user authentication server unit may create the security key (R) and provide the security key (R) to the mobile terminal.

The mobile terminal may create the authentication-related value (eC) by performing an XOR operation on the security key (R) and a result of an XOR operation performed on the authentication key (C) and one or more of identification information and a phone number of the mobile terminal; and the user authentication server unit may create the verification key (C') by performing an XOR operation on the security key (R) and one or more of the identification information and the phone number of the mobile terminal when receiving the authentication-related value (eC).

The user authentication server unit may be configured to create the authentication key (C) using two or more one-time random keys; perform an XOR operation on remaining one-time random keys excluding a random selection key, which is randomly selected from among the two or more one-time random keys, and thereby create the verification key (C') corresponding to the random selection key.

The user authentication server unit may be configured to create the authentication key (C) using two or more one-time random keys; perform an XOR operation on remaining one-time random keys excluding a random selection key, which is randomly selected from among the two or more one-time random keys, and thereby create the verification key (C') corresponding to the random selection key.

The mobile terminal may extract a random number of bits from the created authentication-related value and send the extracted bits, and the user authentication server unit may be configured to calculate the authentication-related value (eC) by performing an XOR operation on the authentication key (C) and the security key (R) after sending the user authentication message, which includes the authentication key (C), and to create the verification key (C') by extracting the random number of bits from the authentication-related value (eC).

The mobile terminal may extract a random number of bits from the created authentication-related value and send the extracted bits to the user authentication server unit, and the user authentication server unit may be configured to calculate the authentication-related value (eC) by performing an XOR operation on the authentication key (C), the security key (R), and one or more of identification information and a phone number of the mobile terminal after sending the user authentication message, which includes the authentication key (C), and to create the verification key (C') by extracting the random number of bits from the authentication-related value (eC).

The user authentication message may be one of a short message service (SMS) message, a long message service (LMS) message, and a multimedia messaging service (MMS) message, and the user authentication server unit may send the user authentication message to the mobile terminal.

The user authentication message may be one of an SMS message, an LMS message, and an MMS message, and the user authentication server unit may provide the authentication key (C) to the service server or a legacy authentication system, whereby the service server or the legacy authentication system may send the user authentication message to the mobile terminal.

The mobile terminal may displays the authentication-related value (eC), and the computer terminal may receive the authentication-related value (eC) from the user and send the authentication-related value (eC) to the user authentication server unit.

The computer terminal may send the authentication-related value (eC) to the user authentication server unit via the service server.

The user terminal unit may include a computer terminal and a mobile terminal, the user authentication message may be a QR code, which includes the authentication key (C), the user authentication server unit may send the user authentication message to the computer terminal, the computer terminal may display the user authentication message, and the mobile terminal may acquire the authentication key (C) by scanning the QR code, which is the user authentication message displayed in the computer terminal, and may create the authentication-related value (eC) using the acquired authentication key (C) and the security key (R).

In order to accomplish the above object, a method for user authentication and identity theft prevention using a one-time random key according to the present invention includes: a user authentication message sending procedure in which, when a user authentication server unit receives a notification that user authentication information matches user information in a legacy authentication system from the legacy authentication system, the user authentication server unit creates a unique authentication key (C) in response to a request for user authentication and sends a user authentication message, which includes the created authentication key (C), to a user terminal unit; an authentication-related value sending procedure in which the user terminal unit receives the user authentication message, creates an authentication-related value (eC) by performing an XOR operation on a security key (R) and the authentication key (C), and sends the authentication-related value (eC) to the user authentication server unit; and a user authentication procedure in which the user authentication server unit creates a verification key (C') by performing an XOR operation on the authentication-related value (eC) and the security key (R) and verifies the authentication-related value (eC) using the created verification key (C').

The user authentication message sending procedure may include creating the authentication key (C) using a single random key in response to the request for user authentication; creating the user authentication message, which includes the created authentication key (C); and sending the user authentication message to the user terminal unit.

The user authentication message sending procedure may include creating the authentication key (C) using two or more one-time random keys in response to the request for user authentication; creating the user authentication message, which includes the created authentication key (C); and sending the user authentication message to the user terminal unit. Also, the user authentication procedure may include performing an XOR operation on remaining one-time random keys excluding a random selection key, which is randomly selected from among the two or more one-time random keys, and thereby creating the verification key (C') corresponding to the random selection key; and performing authentication by determining whether the verification key (C') is identical to the created authentication key (C).

The authentication-related value sending procedure may include acquiring the authentication key (C) from the user authentication message; acquiring the security key (R); and creating the authentication-related value using the authentication key (C) and the security key (R).

In the creating the authentication-related value, a mobile terminal of the user terminal unit may create the authentication-related value (eC) by additionally applying one or more of unique identification information and a phone number of the mobile terminal to the XOR operation.

In the creating the authentication-related value, the mobile terminal of the user terminal unit may extract a random number of bits from the created authentication-related value (eC) and send the extracted bits, and in the user authentication procedure, the user authentication server unit may perform user authentication by determining whether the extracted bits from the authentication-related value are identical to the random number of bits extracted from the verification key (C').

The extracted number of bits and the extracted bits may be randomly selected.

In the user authentication message sending procedure, the user authentication server unit may send the user authentication message in a form of a mobile message to a mobile terminal of the user terminal unit, and in the authentication-related value sending procedure, the mobile terminal may create the authentication-related value (eC) and send the authentication-related value (eC) to the user authentication server unit.

In the user authentication message sending procedure, the user authentication server unit may send the user authentication message in a form of a mobile message to a mobile terminal of the user terminal unit, and the authentication-related value sending procedure may further include creating, by the mobile terminal, the authentication-related value (eC) using the authentication key (C) of the user authentication message and the security key (R), and displaying, by the mobile terminal, the authentication-related value (eC); and receiving, by a computer terminal of the user terminal unit, the authentication-related value, displayed in the mobile terminal, from a user and sending, by the computer terminal, the authentication-related value to the user authentication server unit.

In the user authentication message sending procedure, the user authentication server unit may send the user authentication message in a form of a QR code to a computer terminal of the user terminal unit, and the authentication-related value sending procedure may further include displaying, by the computer terminal, the user authentication message in the form of the QR code; and creating, by a mobile terminal, the authentication-related value (eC) by scanning the QR code displayed in the computer terminal and sending, by the mobile terminal, the created authentication-related value (eC) to the user authentication server unit.

The security key (R) may be created by the mobile terminal in the authentication-related value sending procedure, and may then be provided to the user authentication server unit.

The security key (R) may be created by the user authentication server unit after the authentication key (C) is created, and may then be provided to the mobile terminal.

The present invention may be applied to an existing user authentication system, but user authentication is performed using a one-time security key, which is randomly created without inputting any information, rather than using sensitive personal information or credit information of a user, such as a social security number or the like, thus having an effect in that the personal information and credit information of the user is prevented from being leaked or illegally used by a third party.

Also, the present invention performs user authentication in such a way that a user authentication server provides an authentication key C to a user terminal unit and an authentication-related value, which is the result of an XOR operation on the authentication key C and a randomly created one-time security key R, is sent to the user authentication server. Accordingly, even if an authentication message that includes the authentication key C is leaked or intercepted, a third party may not illegally use the authentication key C, a mobile phone number, or the like.

DETAILED DESCRIPTION OF THE INVENTION

Hereinafter, the configuration and operation of a system for user authentication and identity theft prevention using a one-time random key according the present invention and a method for user authentication and identity theft prevention in the system will be described with reference to the accompanying drawings.

Figure 1:
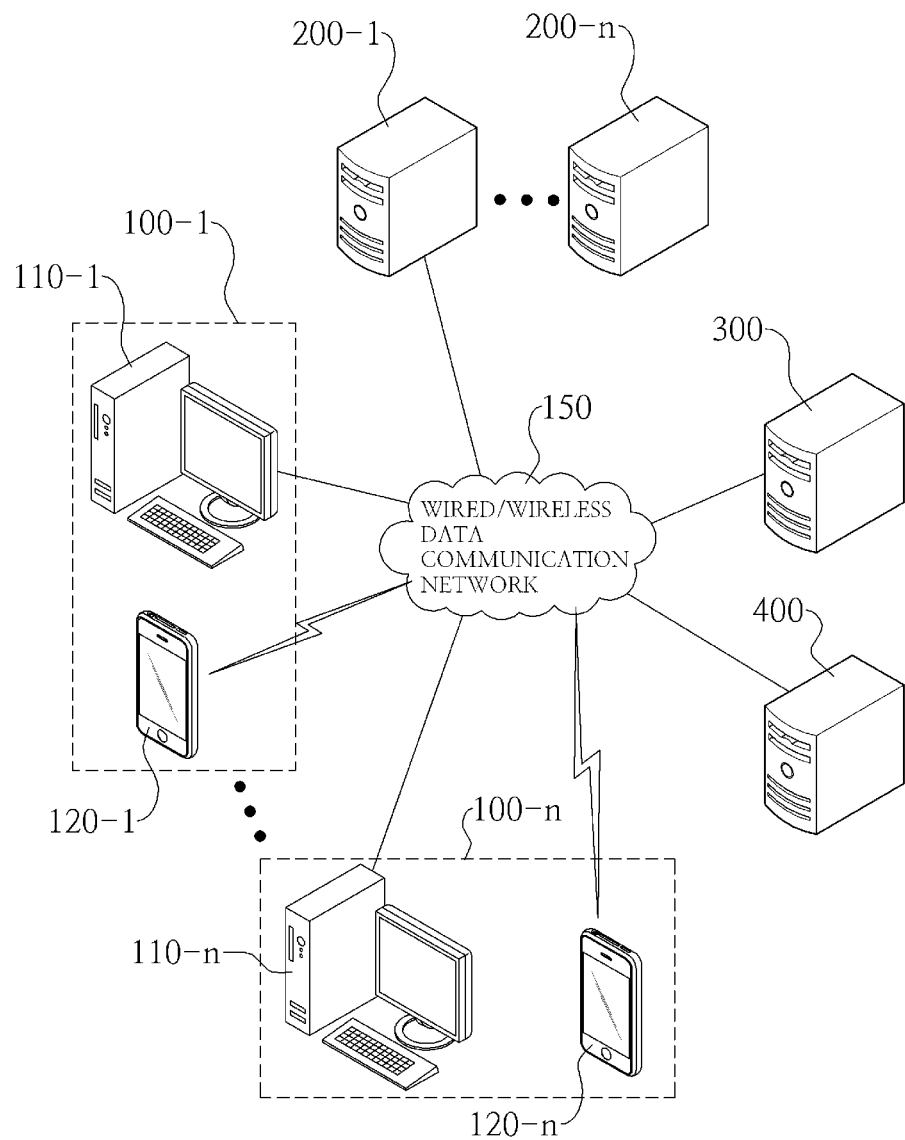
FIG. 1 is a view illustrating the configuration of a system for user authentication and identity theft prevention using a one-time random key according to the present invention.

FIG. 1 is a view illustrating the configuration of a system for user authentication and identity theft prevention using a one-time random key according to the present invention.

Referring to FIG. 1, a system for user authentication and identity theft prevention according to the present invention includes a user terminal unit 100, a service server 200, a user authentication server unit 300 and a legacy authentication system 400.

The user terminal unit 100, the service server 200, the user authentication server unit 300, and the legacy authentication system 400 perform data communication by being connected through a wired/wireless data communication network 150.

The wired/wireless data communication network 150 is a network that includes at least one of a mobile communication network over which data communication is possible, such as a second-generation (2G) network, a third-generation (3G) network, a fourth-generation (4G) Long-Term Evolution (LTE) network, or the like, and the Internet network, in which Wi-Fi, a Wide Area Network (WAN), Local Area Networks (LANs), and the like are combined.

The user terminal unit 100 includes a computer terminal 110 and a mobile terminal 120.

The computer terminal 110 may be a Personal Computer (PC), a laptop, or a smart device such as a smart phone or a smart pad. If the computer terminal 110 is a smart device such as a smart phone or a smart pad, the computer terminal 110 may be used as a mobile terminal 120. In other words, if a terminal carried by a user is a smart device, the user may use the single terminal not only as a computer terminal but also as a mobile terminal.

The computer terminal 110 may be provided with various services from any service server 200 by accessing the service server 200 through the wired/wireless data communication network 150, and may request user authentication with the user's approval when it executes a service that requires user authentication while receiving the service.

The computer terminal 110 may be configured to receive a user authentication message, which includes an authentication key C, from the user authentication server unit 300 and display it according to an embodiment of the present invention, or may be configured to receive an authentication-related value eC from a user and provide it to the user authentication server unit 300 via the service server 200 or directly send the authentication-related value eC to the user authentication server unit 300.

The mobile terminal 120 is a terminal that has its unique identification information (hereinafter, referred to as "mobile terminal identification information") and a phone number, and may be a communication terminal such as a mobile phone, a smart phone, a smart pad, or the like, which may access at least one of 2G, 3G, and 4G mobile communication networks according to an embodiment.

According to a first embodiment and a third embodiment, the mobile terminal 120 receives a user authentication message, which includes an authentication key C, from the user authentication server unit 300, extracts the authentication key C from the received user authentication message, randomly creates a one-time random key R (hereinafter, referred to as "security key R"), and creates an authentication-related value eC by applying the extracted authentication key C and created security key R to the following Equation 1.

$$eC = C \oplus R \qquad \text{Equation 1}$$

where C denotes an authentication key and R denotes a security key.

Also, according to a second embodiment, the mobile terminal 120 receives a user authentication message, which includes an authentication key C, from the user authentication server unit 300, extracts the authentication key C from the received user authentication message, receives a randomly created security key from the user authentication server unit 300, and creates an authentication-related value eC by applying the extracted authentication key and the received random key R to Equation 1.

Also, according to a third embodiment, the mobile terminal 120 receives the authentication key C of the user authentication message displayed in the computer terminal 110, creates a security key R, which is a one-time random key, and creates an authentication-related value eC by applying the authentication key C and the created security key R to Equation 1.

Also, according to a fourth embodiment, the mobile terminal 120 receives the authentication key C of the user authentication message displayed in the computer terminal 110, receives a randomly created security key from the user authentication server unit 300, and creates an authentication-related value eC by applying the authentication key and the received random key R to Equation 1.

According to an embodiment, the created authentication-related value eC may be directly sent from the mobile terminal 120 to the user authentication server unit 300, or may be input to the computer terminal 110 by a user and may then be sent to the user authentication server unit 300, either directly or via the service server 200.

Also, when the mobile terminal 120 creates the security key R as in the first and third embodiments, the mobile terminal 120 must send the created security key R to the user authentication server unit 300.

Also, the mobile terminal 120 may create the authentication-related value eC by selectively applying one or more of its mobile terminal identification information and phone number, as shown in the following Equation 2.

$$eC = C(\oplus MID)(\oplus TNO) \oplus R \qquad \text{Equation 2}$$

where MID is an acronym of Mobile IDentification and denotes mobile terminal identification information such as an Electronic Serial Number (ESN) and an International Mobile Equipment Identity (IMEI), and TNO denotes the phone number of the mobile terminal 120. Also, ( ) represents that the information therein may be selectively applied.

Also, the mobile terminal 120 extracts a random number of bits from the created authentication-related value eC based on a predetermined method of selecting bits (S[ ]), as in the following Equation 3, and may send the extracted bits as a final authentication-related value.

$$eC=S[C(\oplus MID)(\oplus TNO)\oplus R,n] \quad \text{Equation 3}$$

where n denotes the number of bits to be selected, and S is an abbreviation of Select and denotes that n bits are selected according to the predetermined method, whereby the authentication-related value eC may be created.

Here, when n bits are selected, bits in random positions may be extracted using a one-time random key, which the mobile terminal 120 and the user authentication server unit 300 already know.

The service server 200 provides various services, including services that require user authentication, to the computer terminal 110 of the user terminal unit 100, which accesses the service server 200 via the wired/wireless data communication network 150, provides the computer terminal 120 with a means for requesting user authentication when a service that requires user authentication is executed, requests the user authentication server unit 300 to perform user authentication in response to the request for user authentication from the computer terminal 110, and provides the corresponding service to the computer terminal 110 when user authentication, performed in response to the request for the user authentication, succeeds.

The legacy authentication system 400 is an existing authentication system for performing user authentication, and may be a mobile communication system, a credit assessment system, or a public certification system. Because the process of requesting authentication through the legacy authentication system 400 is known technology, a detailed description thereabout will be omitted.

The user authentication server unit 300 sends information input by a user to the legacy authentication system 400 in response to a request for user authentication from the service server 200, creates an authentication key C when it receives a notification that the information input by the user, provided for user authentication, matches user information in the legacy authentication system, sends a user authentication message, including the created authentication key C, to the user terminal unit 100, and provides a security key R to the mobile terminal 120 of the user terminal unit 100 according to the second and fourth embodiments of the present invention.

Here, the authentication key C may be a single one-time random key K, which is randomly created according to an embodiment of the present invention, or may be created using two or more one-time random keys K and R1, as shown in the following Equation 4.

$$C=K\oplus R1 \quad \text{Equation 4}$$

where K and R1 denote one-time random keys.

Also, according to the second and fourth embodiments of the present invention, the user authentication server unit 300 creates a security key R in response to the request for user authentication and provides the created security key R to the mobile terminal 120 of the corresponding user terminal unit 100. After providing the authentication key C, the user authentication server unit 300 monitors whether an authentication-related value eC is received from the user terminal unit 100, creates a verification key C' corresponding to the authentication-related value eC and the security key R, which is acquired according to an embodiment of the present invention, when it receives the authentication-related value eC, verifies the authentication-related value eC using the verification key C', and informs the service server 200 of the success of user authentication when the verification succeeds, whereby the service server 200 may provide the corresponding service to the computer terminal 110 of the user terminal unit 100. Conversely, when the verification fails, the user authentication server unit 300 informs the service server 200 of the failure of user authentication. Accordingly, the service server 200 does not provide the corresponding service.

The user authentication server unit 300 creates the verification key C' using the following Equation 5 when the authentication-related value eC is created using Equation 1, creates the verification key C' using the following Equation 6 when the authentication-related value eC is created using Equation 2, creates the verification key C' using the following Equation 7 when the authentication-related value eC is created using Equation 3, and creates the verification key C' using the following Equation 8 when the authentication key C is created using Equation 4.

$$C'=eC\oplus R \quad \text{Equation 5}$$

$$C'=eC(\oplus MID)(\oplus TNO)\oplus R \quad \text{Equation 6}$$

$$C'=eC'=S[C(\oplus MID)(\oplus TNO)\oplus R,n] \quad \text{Equation 7}$$

$$C'=K'=eC(\oplus MID)(\oplus TNO)\oplus R\oplus R1 \quad \text{Equation 8}$$

Figure 2:
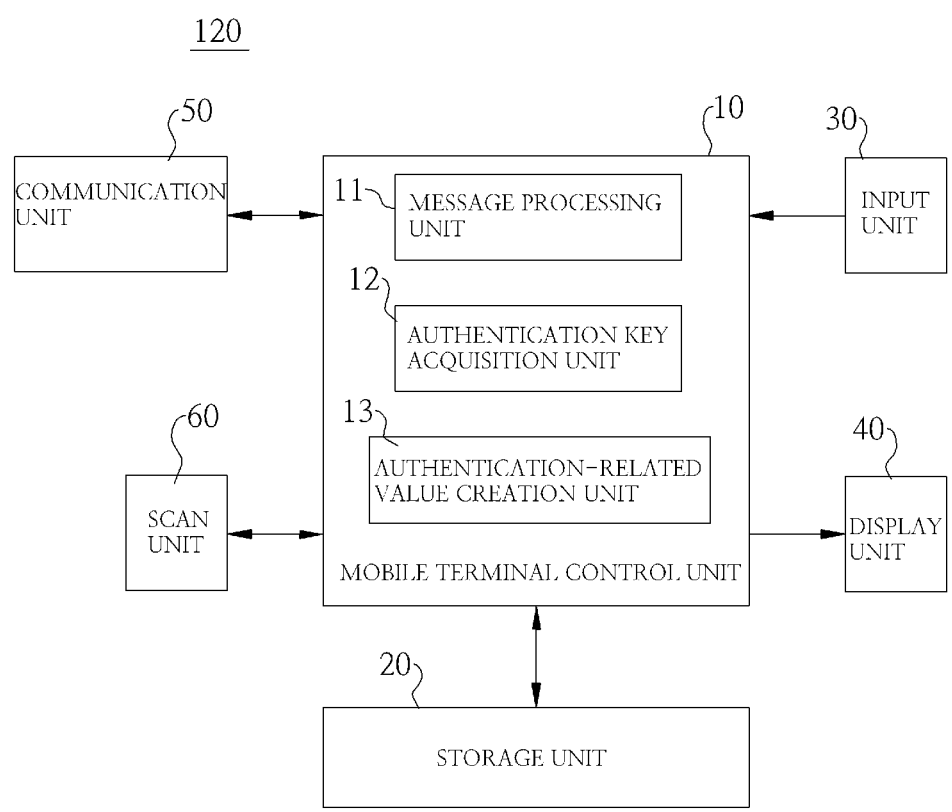
FIG. 2 is a view illustrating the configuration of a mobile terminal in a system for user authentication and identity theft prevention using a one-time random key according to the present invention.

FIG. 2 is a view illustrating the configuration of a mobile terminal in the system for user authentication and identity theft prevention using a one-time random key according to the present invention.

Referring to FIG. 2, the mobile terminal 120 according to the present invention includes a mobile terminal control unit 10, a storage unit 20, an input unit 30, a display unit 40, a communication unit 50, and a scan unit 60.

The storage unit 20 includes a program area for storing a control program for controlling the operation of the mobile terminal 120 according to the present invention, a temporary area for storing data generated when the control program is executed, and a data area for storing user data.

The display unit 40 displays a user authentication message according to the present invention.

The input unit 30 may include one or more of a key input device, which includes multiple letter keys and function keys, and a touch pad in which letters or functions may be selected through the user interface displayed on the display unit 40 by being combined with the display unit 40.

The communication unit 50 performs data communication with other devices connected to the wired/wireless data communication network 150 by being connected to the wired/wireless data communication network 150 and includes a mobile communication unit (not illustrated) for performing data communication using a mobile communication network and a wireless Internet communication unit (not illustrated) for performing data communication using the Internet network.

The scan unit 60 includes a camera, an infrared light transmission unit and an infrared light reception unit, and is configured to scan a QR code, displayed in the computer terminal 110 or the like, and to output it to the mobile terminal control unit 10.

The mobile terminal control unit 10 controls the overall operation of the mobile terminal according to the present invention and includes a message processing unit 11 for processing a user authentication message, which is received via the communication unit 50 according to an embodiment, an authentication key acquisition unit 12 for acquiring the scanned QR code from the message processing unit 11 or the scan unit 60 and acquiring an authentication key C, included in the user authentication message, through the input unit 30, and an authentication-related value creation unit 13 for creating an authentication-related value using the acquired authentication key C and the security key R, which is created by itself or received from the user authentication server unit 300 according to an embodiment.

The authentication-related value creation unit 13 creates the authentication-related value eC using one of Equations 1 to 3 according to an embodiment.

Figure 3:
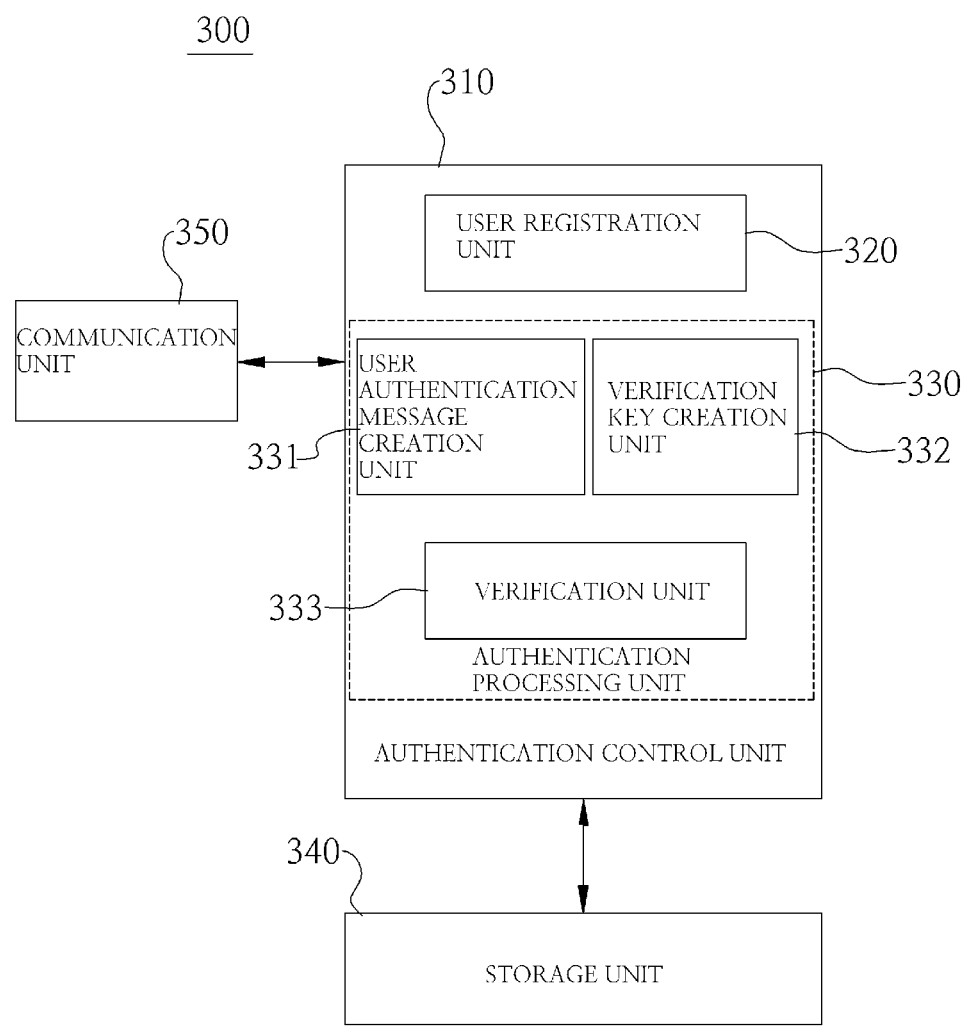
FIG. 3 is a view illustrating the configuration of a user authentication server in a system for user authentication and identity theft prevention using a one-time random key according to the present invention.

FIG. 3 is a view illustrating the configuration of a user authentication server unit in the system for user authentication and identity theft prevention using a one-time random key according to the present invention.

Referring to FIG. 3, the user authentication server unit 300 includes an authentication control unit 310, a storage unit 340, and a communication unit 350.

The storage unit 340 includes a user information DB for storing information about a user (hereinafter, referred to as "user information") corresponding to the user terminal unit 100 and an authentication details DB for storing details associated with the authentication, processed according to the present invention. The user information may include one or more seed keys for creating a security key R for the user according to the embodiments (the second and fourth embodiments) of the present invention, a security key R acquired according to the embodiments (the first and third embodiments) of the present invention, and the mobile terminal identification information and the phone number of the mobile terminal 120 of the user.

The communication unit 350 connects to the wired/wireless data communication network 150, either through cables or in a wireless manner, and performs data communication with other devices connected to the wired/wireless data communication network 150.

The authentication control unit 310 includes a user registration unit 320 and an authentication processing unit 330 and controls the overall operation of the user authentication server unit 300 according to the present invention.

Specifically, the user registration unit 320 provides the user terminal unit 100 with a means for registering a user as a member, receives user information about the corresponding user through the means for registering the user, and registers the user as a member by storing the received user information in the user information DB of the storage unit 340.

For the user registered as a member, the authentication processing unit 330 creates a user authentication message for user authentication and identity theft prevention according to the present invention and verifies an authentication key C, included in the user authentication message.

The authentication processing unit 330 includes a user authentication message creation unit 331, a verification key creation unit 332, and a verification unit 333.

When user authentication is requested and a notification that user information matches user information in the legacy authentication system is received from the legacy authentication system, the user authentication message creation unit 331 creates an authentication key C, creates a user authentication message, which includes the authentication key C, and sends the user authentication message to the corresponding user terminal unit 100 via the communication unit 350. According to an embodiment, the user authentication message may be sent as a push message through an application or an application message, may be sent as a mobile message, such as SMS, LMS, MMS, or the like, or may be sent as an Internet message. When the user authentication message is sent as an application message or a mobile message, it may be sent to the mobile terminal 120. Alternatively, when the user authentication message is sent as an Internet message, it may be sent to one or more of the mobile terminal 120 and the computer terminal 110.

When an authentication-related value eC is received from the user terminal unit 100, the verification key creation unit 332 creates a verification key C' corresponding to the authentication-related value eC using one of Equations 5 to 8 according to an embodiment.

The verification unit 333 verifies the authentication-related value eC using the verification key C', which is created in the verification key creation unit 332, and notifies the service server 200 of the result of the verification. Here, if Equation 8 is applied, the verification unit 333 uses a key K' corresponding to the one-time random key K, which is not used to decode the verification key C', as the verification key. Accordingly, when Equation 8 is used, the verification unit 333 performs authentication by determining whether the verification key C' is the same as the one-time random key K.

In the above description, the case in which the user authentication server unit 300 is configured as a single server is described. However, when the user authentication message is directly sent as an SMS/MMS/LMS message, the message processing unit 11 may be configured as a mobile message sending server (not illustrated), and when the authentication-related value is directly received from the mobile terminal 120, it may be configured as an application server.

Figure 4:
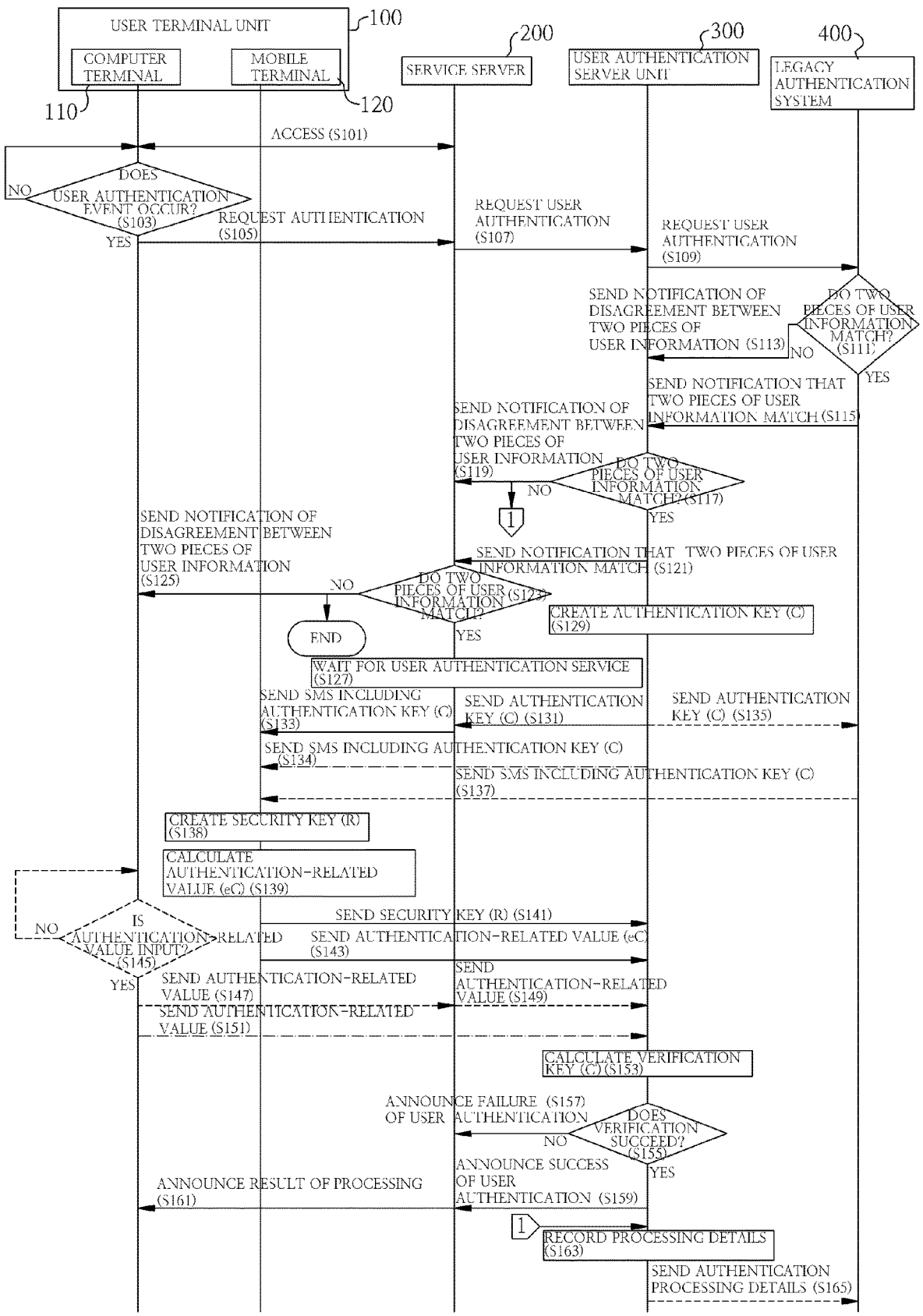
FIG. 4 is a flowchart illustrating a method for user authentication and identity theft prevention using a mobile message and a one-time random key according to a first embodiment of the present invention.

FIG. 4 is a flowchart illustrating a method for user authentication and identity theft prevention using a mobile message and a one-time random key according to the first embodiment of the present invention.

Referring to FIG. 4, first, the user terminal unit 100 accesses the service server 200 at step S101, and checks at step S103 whether a user authentication event occurs, the event occurring when selecting a service that requires user authentication.

When such a user authentication event occurs, the user terminal unit 100 receives user information, required for user authentication, from a user and sends a user authentication request signal, which includes the received user information, to the service server 200 at step S105.

The service server 200 sends the user authentication request signal, which includes the user information input by the user, to the user authentication server unit 300 at step S107 in response to the request for authentication, and the user authentication server unit 300 requests the legacy authentication system 400 to perform user authentication at step S109 by sending the user authentication request signal thereto.

The legacy authentication system 400 compares the user information, input by the user, with previously registered user information corresponding to the user, and thereby determines whether the two pieces of user information are the same as each other at step S111.

When the two pieces of user information differ from each other, the legacy authentication system 400 sends the user authentication server unit 300 a signal for indicating the disagreement between the two pieces of user information at step S113, the signal including a user information disagreement notification message. Conversely, when the two pieces of user information are the same as each other, a signal indicating that the two pieces of user information are the same is sent to the user authentication server unit 300 at step S115.

The user authentication server unit 300 determines at step S117 whether the result of checking the user information, received from the legacy authentication system 400, says that the two pieces of user information are the same, and then sends information about the result of checking the user information to the service server 200 at step S119 or S121.

The service server 200 determines whether the information about the result of checking user information says that the two pieces of user information are the same at step S123, and then notifies the user terminal unit 100 of the disagreement between the two pieces of user information at step S125 when the two pieces of user information differ from each other. Conversely, when the two pieces of user information are the same, the service server sets a service waiting mode at step S127 and waits to receive the result of user authentication.

Meanwhile, the user authentication server unit 300, which was notified that the two pieces of user information are the same, announces that the two pieces of user information are the same at step S121, and then creates an authentication key C at step S129 using a single one-time random key K or by performing an XOR operation on two different one-time random keys K and R1, as in Equation 4.

When the authentication key C is created, the user authentication server unit 300 provides the authentication key C to the service server 200, whereby the service server 200 creates a user authentication message, which includes the authentication key C, and sends it to the mobile terminal 120 of the user terminal unit 100 at steps S131 and S133. Here, the user authentication message may be sent as a mobile message such as an SMS, LMS, MMS, or the like.

Alternatively, the user authentication server unit 300 itself may send a user authentication message, which include the created authentication key C, in the form of a mobile message to the mobile terminal 120 at step S134.

Alternatively, the user authentication server unit 300 may provide the authentication key C to the legacy authentication system 400, whereby the legacy authentication system 400 may create a user authentication message, which includes the authentication key C, and may then send it to the mobile terminal 120 of the corresponding user terminal unit 100 at steps S135 and S137. Here as elsewhere, the user authentication message may be sent as a mobile message. The mobile terminal 120, having received the user authentication message, may display the user authentication message, but may not display it in order to improve security.

When the user authentication message is received, the mobile terminal 120 creates a security key R at step S138.

When the security key R is created, the mobile terminal 120 creates an authentication-related value eC at step S139 by applying the security key R and the authentication key C to any one of Equations 1 to 3.

When the authentication-related value eC is calculated, the mobile terminal provides the created security key R to the user authentication server unit 300 at step S141.

After provision of the security key R, the mobile terminal 120 may directly send the authentication-related value eC to the user authentication server unit 300 at step S143, or may send it to the user authentication server unit 300 through the computer terminal 110 of the user terminal unit 100 at steps S145, S147, S149, and S151, as represented as the dotted lines and the alternating long and short dash lines in FIG. 4. Here, the computer terminal 110 may directly send the authentication-related value eC to the user authentication server unit 300 through steps S145 and S151, or may send it to the user authentication server unit 300 via the service server 200 through steps S145, S147, and S149.

The user authentication server unit 300, having received the security key R and the authentication-related value eC, creates a verification key C' at step S153 using an equation selected from among Equations 5 to 8, which corresponds to the equation that is used to create the authentication-related value among Equations 1 to 4.

When the verification key C' is created, the user authentication server unit 300 verifies the authentication-related value eC using the verification key C' and determines whether the verification succeeds at step S155.

When it is determined that the verification fails, the user authentication server unit 300 notifies the service server 200 of the failure of user authentication at step S157. Conversely, when it is determined that the verification succeeds, the user authentication server unit 300 notifies the service server 200 of the success of user authentication at step S159.

The service server 200, having received the result of user authentication, releases the service waiting mode, sends the result of user authentication to the computer terminal 110 of the user terminal unit 100 that executes the service, and provides the corresponding service to the computer terminal 110 at step S161.

Also, after it provides the result of user authentication, the user authentication server unit 300 may store the processing details associated with user authentication in the storage unit 340 thereof for each user and for each service server 200 at step S163.

Also, the user authentication server unit 300 may be configured to send the processing details associated with user authentication to the legacy authentication system 400 at step S165.

Figure 5:
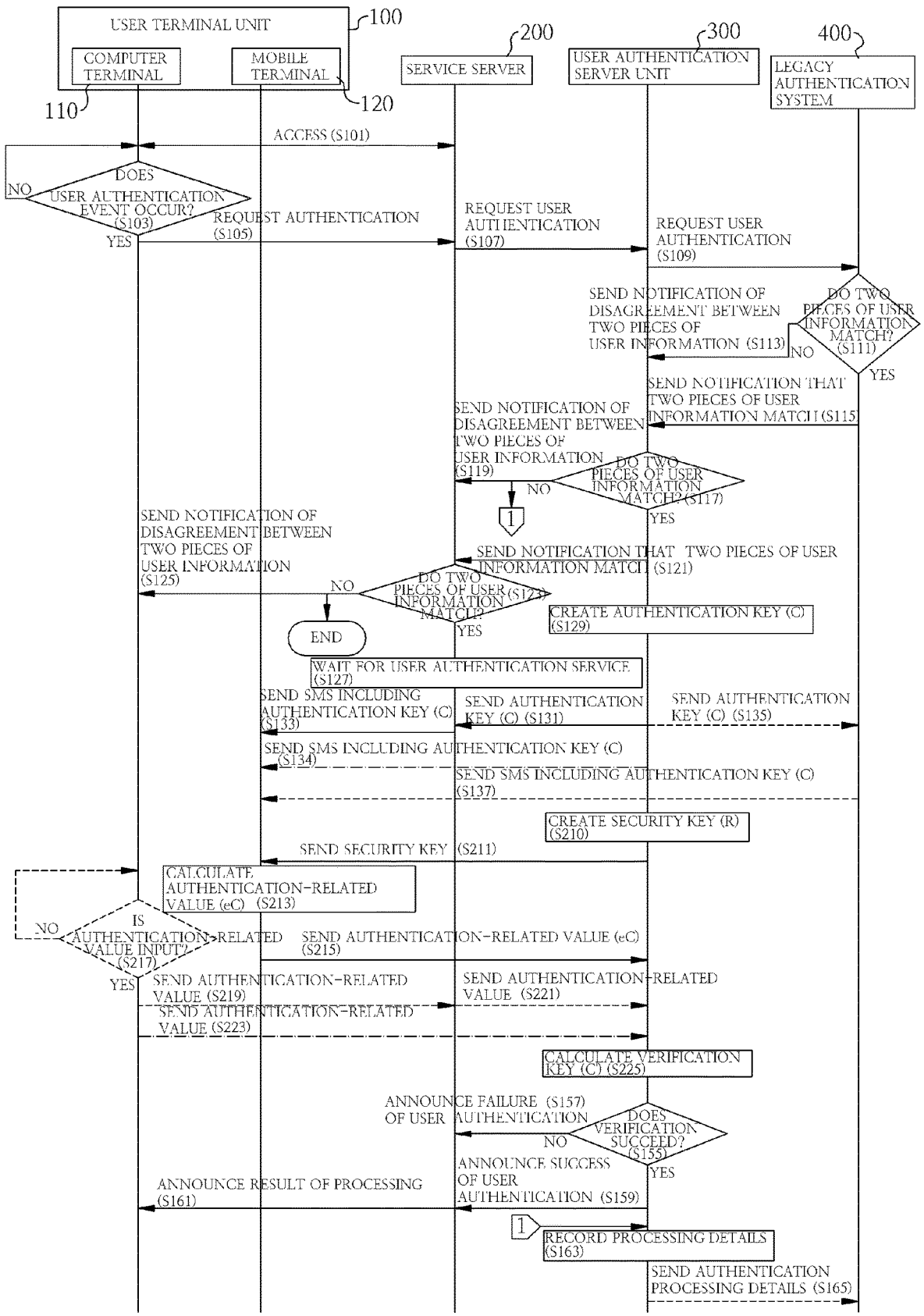
FIG. 5 is a flowchart illustrating a method for user authentication and identity theft prevention using a mobile message and a one-time random key according to a second embodiment of the present invention.

FIG. 5 is a flowchart illustrating a method for user authentication and identity theft prevention using a mobile message and a one-time random key according to the second embodiment of the present invention. In FIG. 5, the same references numerals are used to designate the same processes of FIG. 4, and different reference numerals are used only for configurations that are changed according to the second embodiment. Accordingly, the description with reference to FIG. 5 mainly focuses on the changed configurations.

The authentication server unit 300 sends a user authentication message, which includes an authentication key C, to the mobile terminal 120 of the user terminal unit 100 at steps S131 to S133, step S134, or steps S135 and S137, creates a security key R at step S210, and provides the created security key R to the mobile terminal 120 at step S211.

The mobile terminal 120, having received the security key R, calculates an authentication-related value eC at step S213 by applying the authentication key C, received from the user authentication server unit 300, and the security key R to one of Equations 1 to 3 according to an embodiment.

When the authentication-related value eC is calculated, the mobile terminal 120 directly sends the calculated authentication-related value eC to the user authentication server unit 300 at step S215.

Alternatively, when the mobile terminal 120 displays the calculated authentication-related value eC, a user inputs the displayed authentication-related value eC to the computer terminal 110 at step S217, whereby the computer terminal 110 may send the input authentication-related value eC to the user authentication server unit 300, either directly at step S223 or via the service server 200 at steps S219 and S221.

The user authentication server unit 300, having received the authentication-related value eC, calculates a verification key C' at step S225 by applying the received authentication-related value eC and the created security key R to a corresponding equation selected from among Equations 5 to 8.

When the verification key C' is calculated, the user authentication server unit 300 and the service server 200 perform processes based on the result of user authentication through the same steps in FIG. 4.

Figure 6:
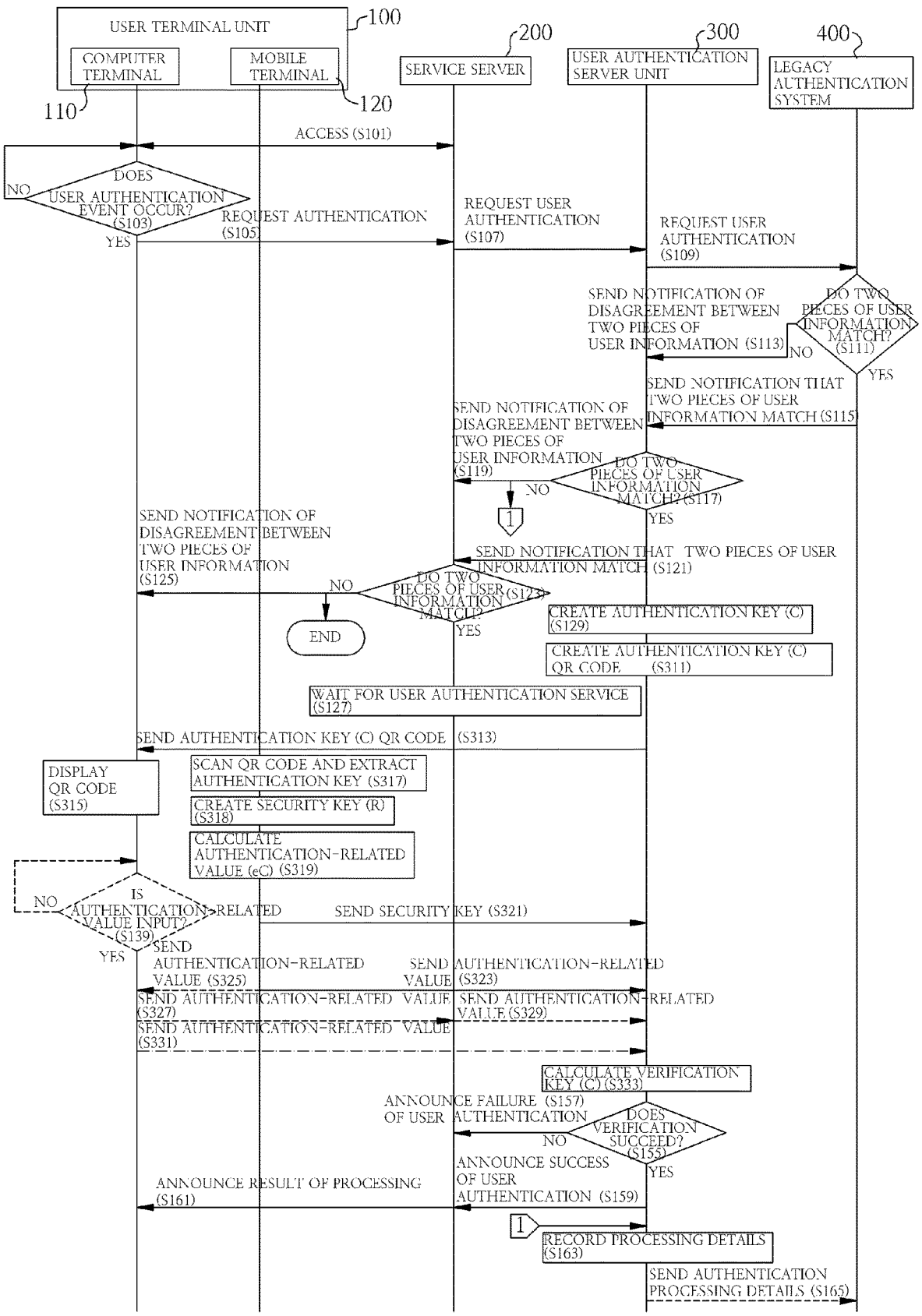
FIG. 6 is a flowchart illustrating a method for user authentication and identity theft prevention using a QR code and a one-time random key according to a third embodiment of the present invention.

FIG. 6 is a flowchart illustrating a method for user authentication and identity theft prevention using a QR code and a one-time random key according to the third embodiment of the present invention. It should be noted that, in the description below with reference to FIG. 6, the description about steps that are the same as those in FIGS. 4 and 5 may be omitted or described briefly.

In FIG. 6, when an authentication key C is created, the user authentication server unit 300 creates a user authentication message, which includes the created authentication key C, at step S129, and then creates a QR code including the created user authentication message at step S311.

When the user authentication message is converted into the QR code, the user authentication server unit 300 sends the user authentication message, converted into the QR code, to one or more of the computer terminal 110 and the mobile terminal 120 of the user terminal unit 100 at step S313.

The computer terminal 110 and the mobile terminal 120, having received the user authentication message in the form of a QR code, display the user authentication message in the form of the QR code at step S315.

Here, when the user authentication message in the form of a QR code is displayed in the computer terminal 110, the mobile terminal 120 receives the code number of the QR code through the input unit 30 thereof or acquires the QR code by scanning the QR code through the scan unit 60 thereof, and then extracts the authentication key C at step S317.

When the authentication key C is acquired, the mobile terminal 120 creates a security key R at step S318 and creates an authentication-related value eC at step S319 by applying the authentication key C and the created security key R to one of Equations 1 to 3.

When the authentication-related value eC is created, the mobile terminal 120 provides the created security key R to the user authentication server unit 300 at step S321.

After the security key R is sent, the mobile terminal 120 or the computer terminal 110 sends the authentication-related value eC to the user authentication server unit 300 at step S323, step S331, or steps S325 to S329.

Depending on the circumstances, the security key R and the authentication-related value eC may be sent together in the form of a single message.

The user authentication server unit 300, having received the security key R and the authentication-related value eC, calculates a verification key C' at step S333 using a corresponding equation selected from among Equations 5 to 8 and performs verification at step S155 using the calculated verification key C'. Because the processes after the verification that are the same as those in FIGS. 4 and 5 have been described with reference to FIG. 4, a description thereabout will be omitted.

Figure 7:
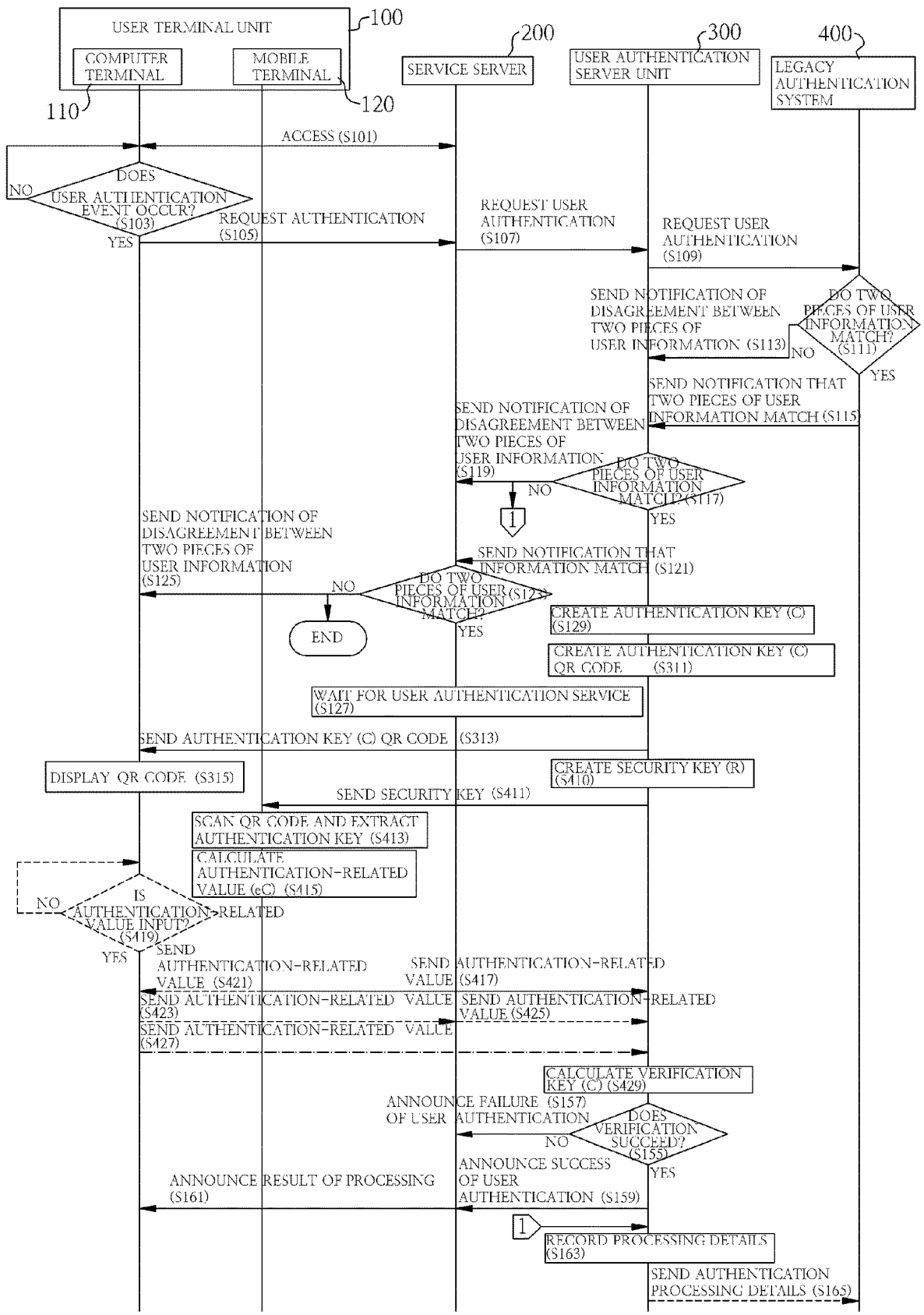
FIG. 7 is a flowchart illustrating a method for user authentication and identity theft prevention using a QR code and a one-time random key according to a fourth embodiment of the present invention.

FIG. 7 is a flowchart illustrating a method for user authentication and identity theft prevention using a QR code and a one-time random key according to the fourth embodiment of the present invention.

Referring to FIG. 7, when the user authentication server unit 300 sends a user authentication message in the form of a QR code, which includes an authentication key, to one or more of the computer terminal 110 and the mobile terminal 120 of the user terminal unit 100 at step S313, as shown in FIG. 6, the computer terminal 110 and/or the mobile terminal 120, having received the QR code, may display the QR code on the screen thereof at step S315.

After it sends the QR code, the user authentication server unit 300 creates a security key R at step S410, and then sends it to the mobile terminal 120 of the user terminal unit 100 at step S411.

When the QR code is displayed in the computer terminal 110, the mobile terminal 120 receives the code number of the QR code through the input unit 30 thereof or acquires the QR code by scanning the QR code through the scan unit 60 thereof, and then extracts the authentication key C at step S413.

When the authentication key C is acquired, the mobile terminal 120 creates an authentication-related value eC at step S415 by applying the security key R, received from the user authentication server unit 300, and the authentication key C to one of Equations 1 to 3.

When the authentication-related value eC is created, the mobile terminal 120 or the computer terminal 110 sends the authentication-related value eC to the user authentication server unit 300 at step S417, steps S419 to S425, or steps S419 and S427.

The user authentication server unit 300, having received the authentication-related value eC, calculates a verification key C' at step S429 using a corresponding equation, selected from among Equations 5 to 8, and performs verification using the calculated verification key C' at step S155.

According to the situation, the expression "configured to" used herein may be used interchangeably with the expression "suitable for", "having the capacity to", "designed to", "adapted to", "made to", or "capable of". The term "configured to" does not mean only "specifically designed to" in hardware. Instead, the expression "a device configured to" may mean that the device is "capable of" operating together with another device or other components. For example, a "processor configured to perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device.

The terminology "module," "terminal," "server" or "device" used herein may mean a unit including one of hardware, software, and firmware or two or more combinations thereof. The term "module," "terminal," "server" or "device" may be interchangeably used with the terms "unit", "logic", "logical block", "component", "circuit", and the like. The "module," "terminal," "server" or "device" may be a minimum unit of an integrated component or a part thereof. The "module," "terminal," "server" or "device" may be a minimum unit performing one or more functions or a part thereof. The "module," "terminal," "server" or "device" may be mechanically or electronically implemented. For example, the "module," "terminal," "server" or "device" may include at least one of an application-specific integrated circuit (ASIC) chip, field-programmable gate arrays (FPGAs), or a programmable-logic device, which is well known or will be developed in the future, for performing certain operations.

At least part of the electronic device (e.g., "module," "terminal," "server" or "device") or a method (e.g., operations) of the electronic device may be implemented with instructions stored in computer-readable storage media which have a program module. When the instructions are executed by a processor, one or more processors may perform functions corresponding to the instructions. The computer-readable storage media may be a memory.

The computer-readable storage media may include a hard disc, a floppy disk, magnetic media (e.g., a magnetic tape), optical media (e.g., a compact disc read only memory (CD-ROM) and a DVD), magneto-optical media (e.g., a floptical disk), a hardware device (e.g., a ROM, a random access memory (RAM), a flash memory, and the like), and the like. Also, the program instructions may include not only mechanical codes compiled by a compiler but also high-level language codes which may be executed by a computer using an interpreter. The above-mentioned hardware device may be configured to operate as one or more software modules to perform operations according to various embodiments of the present disclosure, and vice versa.

The above-described embodiments of the present disclosure can be implemented in hardware, firmware or via the execution of software or computer code that can be stored in a recording medium such as a CD ROM, DVD, a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, flash, etc. that may store or receive software or computer code that when accessed and executed by the computer, processor or hardware implement the processing methods described herein.

The "module," "terminal," "server" or "device" may include a microprocessor or any suitable type of processing circuitry, such as one or more general-purpose processors (e.g., advanced reduced instruction set computing machine (ARM)-based processors), a digital signal processor (DSP), a programmable logic device (PLD), an application-specific integrated circuit (ASIC), a field-programmable gate array (FPGA), a GPU, a video card controller, etc. In addition, it would be recognized that when a general purpose computer accesses code for implementing the processing shown herein, the execution of the code transforms the general purpose computer into a special purpose computer for executing the processing shown herein. Any of the functions and steps provided in the drawings may be implemented in hardware, software or a combination of both and may be performed in whole or in part within the programmed instructions of a computer. In addition, as used herein, a processor or microprocessor may be implemented as hardware.

Embodiments of the present disclosure described and shown in the drawings are provided as examples to describe technical content and help understanding but do not limit the present disclosure. Accordingly, it should be interpreted that besides the embodiments listed herein, all modifications or modified forms derived based on the technical ideas of the present disclosure are included in the present disclosure. Accordingly, the scope of the present disclosure is defined not by the detailed description and embodiments, but by the following claims and their equivalents.

Should also be noted that, various the disclosed embodiments with in a wide variety of applications, can comprise lamp, optical projection system, portable projector and/or other displays in liquid crystal display (LCD), LCD backlight, digital bulletin board, organic LED display, AMOLED (Active matrix OLED) display, LED, illuminator, conventional jack connection, lamp or illumination related application.

Meanwhile, the present invention is not limited to the above-described preferred embodiments, and those skilled in the art will appreciate that various modifications, additions and substitutions are possible, without departing from the scope and spirit of the invention as disclosed in the accompanying claims. It should be understood that as long as the implementation of improvements, modifications, additions and substitutions fall within the scope of the accompanying claims, the spirit thereof belongs to the scope of the present invention.

DESCRIPTION OF THE REFERENCE NUMERALS IN THE DRAWINGS

10: mobile terminal control unit
11: message processing unit
12: authentication key acquisition unit
13: authentication-related value creation unit
20: storage unit
30: input unit
40: display unit
50: communication unit
60: scan unit
100: user terminal unit
110: computer terminal
120: mobile terminal
200: service server
300: user authentication server unit
310: authentication control unit
320: user registration unit
330: authentication processing unit
331: user authentication message creation unit
332: verification key creation unit
333: verification unit
340: storage unit
350: communication unit.

What is claimed is:

1. A system for a user authentication and identity theft prevention using a one-time random key, comprising:
a computer terminal comprising a processor configured to access, via a network, a service server, and request the user authentication in order to use a service that requires the user authentication through the service server; and
a mobile terminal comprising a processor configured to receive, via the network, a user authentication message, which includes an authentication key,
create an authentication-related value by performing a first Exclusive-OR (XOR) operation on the authentication key and a security key, wherein the security key comprises a plurality of one-time random keys including a selected one-time random key, wherein creating the authentication-related value uses one of a first set of plurality of pre-determined equations each of which distinctively performs the first Exclusive-OR (XOR) operation on the authentication key and the security key, and
send, via the network, the authentication-related value; and
a user authentication server comprising a processor configured to
create the authentication key by performing a third Exclusive-OR (XOR) operation on a couple of selected one-time random keys, in response to a request for the user authentication,
send, via the network, the user authentication message including the authentication key, to the mobile terminal,
receive, via the network, the authentication-related value from the mobile terminal,
create a verification key by performing a second XOR operation on the plurality of one-time random keys except the selected one-time random key, wherein creating the verification key uses one of a second set of plurality of pre-determined equations each of which distinctively performs the second XOR operation on the plurality of one-time random keys except the selected one-time random key, and the each of the second set of plurality of pre-determined equations distinctively corresponds to one of the first set of plurality of pre-determined equations, and
perform the user authentication by verifying whether the verification key is identical to the authentication key
wherein the computer terminal, the mobile terminal, and the user authentication server are separated hardware devices and connected with each other via the network, and the network includes at least one of a cellular network, a Wi-Fi network, a Wide Area Network (WAN), and a Local Area Network (LAN).

2. The system of claim 1, wherein the mobile terminal comprising a display configured to display the authentication-related value, and
the computer terminal comprises a camera configured to capture an image of the authentication-related value displayed on the display of the mobile terminal,
wherein the processor of the computer terminal is further configured to extract computer-readable data including the authentication-related value from the captured image, and send the computer-readable data including the authentication-related value, via the network, to the user authentication server.

3. The system of claim 2, wherein the processor of the computer terminal is further configured to send the authentication-related value to the user authentication server directly or via the service server.

4. The system of claim 1, wherein the processor of the mobile terminal is further configured to create the security key and provide the created security key to the user authentication server.

5. The system of claim 1, wherein the processor of the user authentication server is further configured to create the security key and provide the created security key to the mobile terminal.

6. The system of claim 1,
wherein the first XOR operation includes a first additional XOR operation on the authentication key and one or more of identification information and a phone number of the mobile terminal, and a second additional XOR operation on the security key and a result of the first additional XOR operation, and
wherein the second XOR operation includes a third additional XOR operation on the authentication-related value and one or more of the identification information and the phone number of the mobile terminal, and a fourth additional XOR operation on the security key and a result of the third additional XOR operation.

7. The system of claim 1, wherein:
the processor of the mobile terminal is further configured to extract a random number of bits from the created authentication-related value based on a predetermined method of selecting bits, and send the extracted bits to the user authentication server, and
wherein the processor of the user authentication server is further configured to, after sending the user authentication message, calculate an additional authentication-related value by performing the second XOR operation on the authentication key, the security key, one or more of identification information and a phone number of the mobile terminal, and create the verification key by extracting the random number of bits from the additional authentication-related value based on the predetermined method of selecting the bits, and
verify the extracted bits sent from the mobile terminal by determining whether the extracted bits sent from the mobile terminal is identical to the verification key.

8. The system of claim 1, wherein
the user authentication message is one of a short message service (SMS) message, a long message service (LMS) message, and a multimedia messaging service (MMS) message.

9. The system of claim 1, wherein
wherein the processor of the user authentication server is configured to send the authentication key to the mobile terminal via the service server or a legacy authentication system.

10. The system of claim 1, wherein:
the user authentication message is a QR code including the authentication key;
the processor of the user authentication server is further configured to send the user authentication message to the computer terminal;
the computer terminal comprises a display configured to display the user authentication message; and
the mobile terminal comprises a camera configured to capture an image of the QR code displayed on the display of the computer terminal,
wherein the processor of the mobile terminal is further configured to extract computer-readable data including the authentication key from the captured image, and create the authentication-related value using the authentication key and the security key.

11. A method for user authentication and identity theft prevention using a one-time random key, comprising:
a user authentication message sending procedure in which, when a user authentication server including a processor receives, via a network, a notification that user authentication information matches user information in a legacy authentication system from the legacy authentication system, the processor of the user authentication server creates an authentication key by using a plurality of one-time random keys including a selected one-time random key, in response to a request for user authentication and sends a user authentication message including the created authentication key, via the network, to a user terminal;
an authentication-related value sending procedure in which the user terminal including a processor receives, via the network, the user authentication message, the processor of the user terminal creates an authentication-related value by performing a first XOR operation on the authentication key and a security key comprising the plurality of one-time random keys including the selected one-time random key, and sends the authentication-related value, via the network, to the user authentication server; and a user authentication procedure in which the processor of the user authentication server creates a verification key by performing a second XOR operation on the plurality of one-time random keys except the selected one-time random key, and verifies whether the created verification key is identical to the authentication key, wherein the network includes at least one of a cellular network, a Wi-Fi network, a Wide Area Network (WAN), and a Local Area Network (LAN).

12. The method of claim 11, wherein the user authentication message sending procedure comprises:
creating, by the processor of the user authentication server, the authentication key by using two or more one-time random keys including a random selection key, in response to the request for user authentication;
creating, by the processor of the user authentication server, the user authentication message including the created authentication key; and
sending, by the processor of the user authentication server, the user authentication message, via the network, to the user terminal.

13. The method of claim 11, wherein the authentication-related value sending procedure comprises:
acquiring, by the processor of the user terminal, the authentication key from the user authentication message; and
acquiring, by the processor of the user terminal, the security key.

14. The method of claim 13, wherein the authentication-related value sending procedure comprises a step in which a processor of a mobile terminal included in the user terminal creates the authentication-related value by additionally applying one or more of identification information and a phone number of the mobile terminal to the first XOR operation.

15. The method of claim 13, wherein the user authentication message sending procedure comprising a step in which the processor of the user authentication server sends the user authentication message in a form of a mobile message, via the network, to a mobile terminal included in the user terminal, and
wherein the authentication-related value sending procedure comprises a step in which a processor of the mobile terminal creates the authentication-related value and sends the authentication-related value, via the network, to the user authentication server.

16. The method of claim 13, wherein the user authentication message sending procedure further comprises a step in which the processor of the user authentication server sends the user authentication message in a form of a mobile message, via the network, to a mobile terminal included in the user terminal, and
wherein the authentication-related value sending procedure further comprises:
displaying, on a display of the mobile terminal, the authentication-related value;
capturing, by a camera of a computer terminal included in the user terminal, an image of the authentication-related value displayed on the display of the mobile terminal;
extracting, by a processor of the computer terminal, computer-readable data including the authentication-related value, from the captured image; and
sending, by the processor of the computer terminal, the computer-readable data including the authentication-related value, via the network, to the user authentication server.

17. The method of claim 13, wherein the user authentication message sending procedure further comprises a step in which the processor of the user authentication server sends the user authentication message in a form of a QR code, via the network, to a computer terminal included in the user terminal, and
wherein the authentication-related value sending procedure further comprises:
displaying, on a display of the computer terminal, the user authentication message in the form of the QR code;
capturing, by a camera of a mobile terminal included in the user terminal, an image of the QR code, including the authentication key, displayed on the display of the computer terminal;
extracting, by a processor of the mobile terminal, computer-readable data including the authentication key, from the captured image;
creating the authentication-related value by performing a first XOR operation on the authentication key and a security key; and
sending, by the processor of the mobile terminal, the computer-readable data including the authentication-related value, via the network to the user authentication server.

18. The method of claim 11, wherein the authentication-related value sending procedure further comprises a step in which a processor of a mobile terminal included in the user terminal extracts a random number of bits from the created authentication-related value based on a predetermined method of selecting bits and sends the extracted bits to the user authentication server, and
wherein the user authentication procedure further comprises a step in which the processor of the user authentication server performs user authentication by determining whether the extracted bits sent by the mobile terminal is identical to the verification key, which is created by extracting the random number of bits, based on the predetermined method of selecting the bits, from an additional authentication-related value calculated by performing the second XOR operation on the authentication key, the security key, one or more of identification information and a phone number of the mobile terminal.

19. The method of claim 18, wherein the extracted bits from the created authentication-related value and verification key extracted from the additional authentication-related value are randomly selected.

20. The method of claim 11, wherein the authentication-related value sending procedure further comprising:
creating, by a processor of a mobile terminal included in the user terminal, the security key; and
sending, by the processor of the mobile terminal, the security key, via the network, to the user authentication server.

21. The method of claim 11, wherein the user authentication message sending procedure further comprising:

creating, by the processor of the user authentication server, after the authentication key is created, the security key; and sending, by the processor of the user authentication server, the security key, via the network, to a mobile terminal included in the user terminal.

\* \* \* \* \*